United States Patent
Wrede et al.

(10) Patent No.: US 8,490,483 B2
(45) Date of Patent: Jul. 23, 2013

(54) MICROMECHANICAL YAW-RATE SENSOR

(75) Inventors: Martin Wrede, Reutlingen (DE);
Johannes Classen, Reutlingen (DE);
Torsten Ohms, Vaihingen/Enz-Aurich (DE); Carsten Geckeler, Tuebingen (DE); Burkhard Kuhlmann, Reutlingen (DE); Jens Frey, Filderstadt (DE);
Daniel Christoph Meisel, Vaihingen An der Enz (DE); Joerg Hauer, Reutlingen (DE); Thorsten Balslink, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 325 days.

(21) Appl. No.: 12/834,953

(22) Filed: Jul. 13, 2010

(65) Prior Publication Data
US 2011/0023600 A1 Feb. 3, 2011

(30) Foreign Application Priority Data
Jul. 21, 2009 (DE) .................. 10 2009 027 897

(51) Int. Cl.
*G01C 19/56* (2012.01)
(52) U.S. Cl.
USPC ............................ 73/504.12; 73/504.04
(58) Field of Classification Search
USPC ............. 73/504.12, 504.04, 504.13, 504.14, 73/504.02
See application file for complete search history.

(56) References Cited

U.S. PATENT DOCUMENTS

| | | | | | |
|---|---|---|---|---|---|
| 5,869,760 | A | * | 2/1999 | Geen | 73/504.12 |
| 5,889,207 | A | * | 3/1999 | Lutz | 73/504.13 |
| 5,996,409 | A | * | 12/1999 | Funk et al. | 73/504.04 |
| 6,349,597 | B1 | * | 2/2002 | Folkmer et al. | 73/504.02 |
| 6,837,107 | B2 | * | 1/2005 | Geen | 73/504.04 |
| 6,859,751 | B2 | * | 2/2005 | Cardarelli | 702/141 |
| 7,168,317 | B2 | * | 1/2007 | Chen et al. | 73/504.04 |
| 7,284,429 | B2 | * | 10/2007 | Chaumet et al. | 73/504.12 |
| 7,461,552 | B2 | * | 12/2008 | Acar | 73/504.04 |
| 7,694,563 | B2 | * | 4/2010 | Durante et al. | 73/504.12 |
| 8,113,050 | B2 | * | 2/2012 | Acar et al. | 73/504.04 |
| 8,186,221 | B2 | * | 5/2012 | Lin et al. | 73/514.32 |
| 2010/0000321 | A1 | | 1/2010 | Neul et al. | |

FOREIGN PATENT DOCUMENTS

DE 102006047135 2/2008
DE 102006052522 5/2008

* cited by examiner

*Primary Examiner* — Helen Kwok
(74) *Attorney, Agent, or Firm* — Kenyon & Kenyon LLP (57) ABSTRACT

A micromechanical yaw-rate sensor comprising a first yaw-rate sensor element, which outputs a first sensor signal, which contains information about a rotation around a first rotational axis, a second yaw-rate sensor element, which outputs a second sensor signal, which contains information about a rotation around a second rotational axis, which is perpendicular to the first rotational axis, a drive, which drives the first yaw-rate sensor element, and a coupling link, which mechanically couples the first yaw-rate sensor element and the second yaw-rate sensor element to one another, so that driving of the first yaw-rate sensor element also causes driving of the second yaw-rate sensor element.

9 Claims, 7 Drawing Sheets

MICROMECHANICAL YAW-RATE SENSOR

CROSS-REFERENCE

The present application claims the benefit under 35 U.S.C. §119 of German Patent Application No. DE 102009027897.4 filed on Jul. 21, 2009, which is expressly incorporated herein by reference in its entirety.

FIELD OF THE INVENTION

The present invention relates to micromechanical yaw-rate sensors.

BACKGROUND INFORMATION

Micromechanical yaw-rate sensors are used in the automotive field, for example in ESP systems, for rollover sensing, or for navigation purposes. The object of the yaw-rate sensor is the correct measurement of the automobile movement around a rotational axis.

A conventional micromechanical yaw-rate sensor has an oscillating body, which extends in an x-y plane and is set into a linear oscillation along a spatial axis (e.g., x-axis) lying in this plane. In the event of a rotation around a rotational axis (z-axis) which is perpendicular to the plane, the Coriolis force causes a displacement of the oscillating body in a direction (y-axis) which is in the plane perpendicular to the oscillation axis (x-axis). This displacement may be capacitively detected and analyzed with the aid of measuring electrodes. In the case of this yaw-rate sensor, the rotational axis is perpendicular to the plane of the oscillating body ("out of plane"). Such a yaw-rate sensor is described, for example, in German Patent Application No. DE 10 2006 047 135 A1.

A further conventional micromechanical yaw-rate sensor has an oscillating body, which extends in the x-y plane and is set into a rotating oscillation around a rotational axis (z-axis) perpendicular to this plane. A rotation of the yaw-rate sensor around the x-axis or the y-axis causes tilting of the sensor. This tilting may be capacitively detected and analyzed with the aid of measuring electrodes. In the case of this yaw-rate sensor, the detected rotational axis is in the plane of the oscillating body ("in plane"). Such a sensor, which may detect a rotation around up to two rotational axes, is described, for example, in German Patent Application No. DE 10 2006 052 522 A1.

For many applications, however, it is insufficient to detect the rotation around two rotational axes. Rather, the movement of a body, such as a motor vehicle, is described by six degrees of freedom, namely by the movement along the three spatial axes and the rotation around the three spatial axes. There is already a demand for automobile sensor systems which detect all three yaw rate axes, namely rotations around the yaw axis for the ESP, rotations around the roll axis for rollover detection, and rotations around a horizontal axis perpendicular to these axes for detecting pitch movements.

SUMMARY

A micromechanical yaw-rate sensor is provided, having: a first yaw-rate sensor element, which outputs a first signal, which contains information about a rotation of the yaw-rate sensor around a first rotational axis, a second yaw-rate sensor element, which outputs a second sensor signal, which contains information about a rotation of the yaw-rate sensor around a second rotational axis, which is perpendicular to the first rotational axis, a drive, which drives the first yaw-rate sensor element, and a coupling link, which mechanically couples the first yaw-rate sensor element and the second yaw-rate sensor element to one another, so that driving of the first yaw-rate sensor element also causes driving of the second yaw-rate sensor element.

According to an example embodiment of the present invention, two or more yaw-rate sensor elements are mechanically coupled to one another so that a drive of the first yaw-rate sensor element is transmitted via the coupling link to the second yaw-rate sensor element. In this way, at least one drive, including the associated controller and power supply, is able to be eliminated. Furthermore, the sensor signals output by the yaw-rate sensor elements are synchronized with respect to frequency and phasing due to the coupling. Therefore, corresponding redundancies may also be removed in the analysis, and drive detection and signal detection only need to be provided once.

The first yaw-rate sensor element may be designed as a linear oscillator and may have a first oscillating body, which may be set into a linear oscillating movement, which is perpendicular to the first rotational axis, in relation to a substrate. The second yaw-rate sensor element may be designed as a rotational oscillator, which has a second oscillating body, which may be set into a rotational oscillating movement in relation to the substrate in an oscillation plane which is parallel to the second rotational axis. The first sensor element thus detects rotations around an axis which is "out of plane" and the second sensor element detects rotations around an axis which is "in plane," so that rotations around two axes perpendicular to one another may be detected using one sensor system. The linear oscillator and the rotational oscillator advantageously extend in the same plane. "Extend in one plane" means in this case that the extension in the directions spanned by the plane is significantly (e.g., at least five times) greater than the extension in the direction perpendicular to the plane.

It is advantageous if the rotational oscillator outputs two sensor signals, the second yaw-rate sensor element outputting a second sensor signal and a third sensor signal, the second sensor signal containing information about a rotation around a second rotational axis, which is parallel to the oscillation plane, and the third sensor signal containing information about a rotation around a third rotational axis, which is parallel to the oscillation plane and non-parallel to the first rotational axis.

The first yaw-rate sensor element may have two linear oscillators, and the rotational oscillator may be situated between the two linear oscillators. A yaw-rate sensor which is particularly compact may thus be provided.

The first yaw-rate sensor element and the second yaw-rate sensor element may be integrated in a single semiconductor chip, in particular a silicon chip. It is advantageous if the oscillating bodies of the yaw-rate sensor elements are structured in the semiconductor material of the semiconductor chip, and coupling webs manufactured from the semiconductor material are provided as the coupling link. This allows a particularly compact system. Because the yaw-rate sensor elements may be manufactured in parallel to one another, a particularly cost-effective manufacture is thus also possible.

The semiconductor webs may be angled and/or curved in order to minimize the mechanical stress.

The yaw-rate sensor may further have a multiplexer, a signal processing unit, and a demultiplexer, the first and the second yaw-rate sensor elements each outputting at least one sensor signal, which contains information about a rotation around one rotational axis, to the multiplexer; the multiplexer supplying one of the sensor signals at a time to the signal processing unit at various times (e.g., cyclically); the signal processing unit subjecting the sensor signal supplied thereto to processing and outputting it to the demultiplexer; and the demultiplexer having multiple outputs, and switching or demultiplexing the processed sensor signal to the various outputs at different times (e.g., cyclically). Therefore, the circuit elements provided for the signal processing of the sensor signals are only provided once, so that a savings of circuit elements and a reduction of the space required on the chip may be achieved. The signal processing unit may advantageously be designed as an integrated circuit and may be provided on the same chip as the first and the second sensor elements. The signal processing unit may have a demodulator, which demodulates the sensor signal supplied thereto, and a low-pass filter, which subjects the demodulated sensor signal to low pass filtering, for example.

It may be advantageous for the mechanical properties if the first yaw-rate sensor element and the second yaw-rate sensor element have a congruent mirror plane or form a rotationally symmetric or mirror-symmetric system.

DETAILED DESCRIPTION OF EXAMPLE EMBODIMENTS

First Exemplary Embodiment

Figure 1:
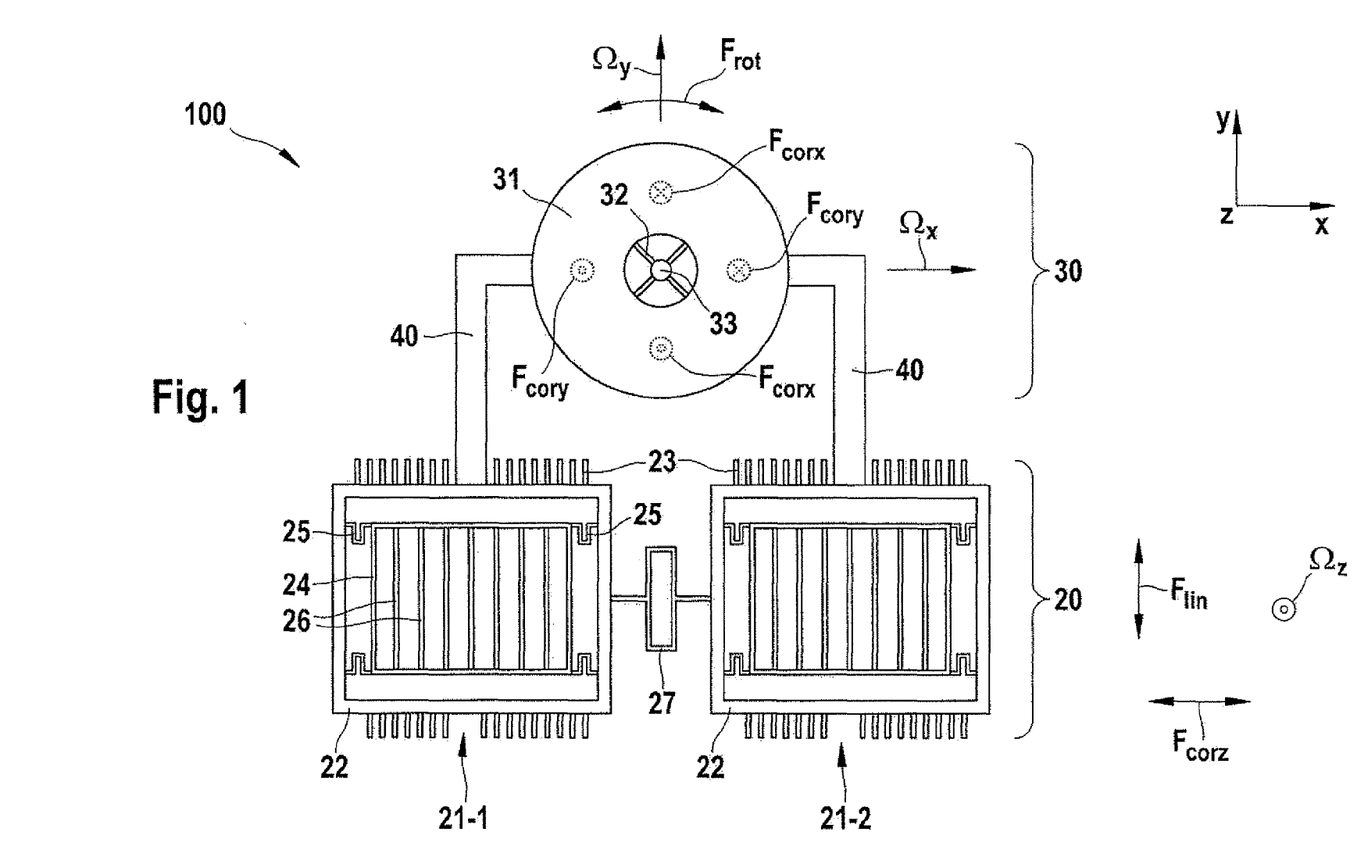
FIG. 1 is a diagram of a yaw-rate sensor according to a first specific embodiment.

FIG. 1 is a diagram of a yaw-rate sensor 100 as per a first specific embodiment according to the present invention.

Yaw-rate sensor 100 has a first yaw-rate sensor element 20 and a second yaw-rate sensor element 30, which are coupled to one another via coupling links 40.

Yaw-rate sensor element 20 is designed as a two-mass system having two linear oscillators 21-1, 21-2. The two linear oscillators 21-1, 21-2 are mechanically coupled to one another via a spring 27. Each of two linear oscillators 21-1, 21-2 has a drive frame 22, a plurality of drive electrodes 23 being provided on each of two diametrically opposite sides of drive frame 22. A detection frame 24 which is connected to drive frame 22 via spring elements 25 is situated inside drive frame 22. It is also possible to connect detection frame 24 via a further frame, which is mounted between detection frame 24 and drive frame 22, as well as to connect corresponding spring elements to detection frame 24, in order to allow free oscillation of detection frame 24 in the x and y-directions in relation to drive frame 22.

Detector electrodes 26 are provided in detection frame 24. Detector electrodes 26 form an electrode grid. One or more stator electrodes (not shown) which are situated parallel to detector electrodes 26 on the substrate is assigned to each of detector electrodes 26. Each of detector electrodes 26 thus forms, with the stator electrodes assigned thereto, capacitive elements each made of one detector electrode 26 and at least one stator electrode.

A drive frame 22, drive electrodes 23 situated thereon, detection frame 24 situated therein, spring elements 25 situated between them, and detector electrodes 26 together form an oscillating body extending in the x-y plane, which may be set into oscillation in the y-direction in relation to the substrate. For this purpose, counter electrodes (not shown in greater detail) are provided diametrically opposite to drive electrodes 23. If a suitable drive voltage (AC voltage) is applied between drive electrodes 23 and the counter electrodes, an electrostatic force $F_{lin}$ acts in the y-direction on drive frame 22, as shown in FIG. 1 by a solid double arrow. Drive frame 22 or the oscillating body is mounted in relation to the chip substrate so that it may be set into oscillation in the y-direction by suitable variation of the applied drive voltage.

If yaw-rate sensor 100 is rotated around the z-axis, a Coriolis force $F_{corz}$ acts on moved detector electrodes 26, which is shown in FIG. 1 by a dashed double arrow. Coriolis force $F_{corz}$ results in forces which act in the x-direction and change the distance between detector electrodes 26 and the stator electrodes adjacent thereto. The capacitance of the capacitive elements formed by detector electrodes 26 and the stator electrodes thus also changes. This capacitance change is converted by capacitance meters into corresponding voltage signals, which contain information about the yaw rate applied at sensor 100. First yaw-rate sensor element 20 thus detects yaw rate $\Omega_z$ of rotations around a rotational axis which is "out of plane" or perpendicular to the plane in which the oscillating bodies of linear oscillators 21-1, 21-2 extend.

Figure 2:
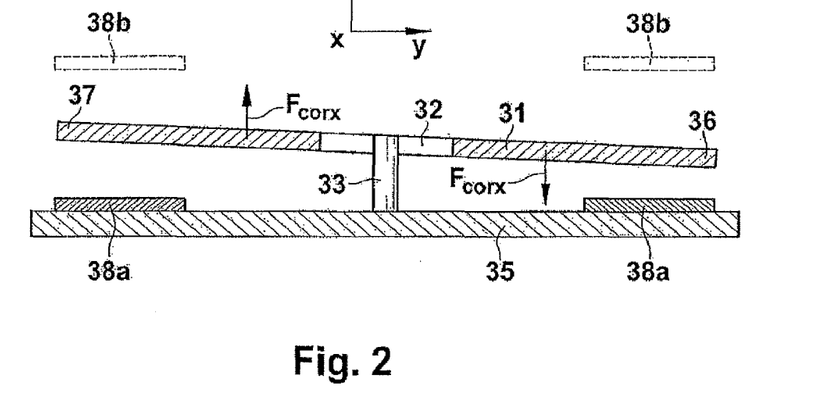
FIG. 2 is a sectional view cut in the y-direction along the diagonal of oscillating body 31 in FIG. 1.

Second yaw-rate sensor element 30 is a rotational oscillator, whose configuration is shown in greater detail in FIG. 2. This rotational oscillator has a disk-shaped oscillating body 31, which is connected via four springs 32 to a hub 33, for example. Springs 32 are situated in a circular central recess of oscillating body 31, into which hub 33 protrudes. The end of hub 33 oriented opposite to oscillating body 31 is situated fixedly on chip substrate 35.

If yaw-rate sensor element 30 experiences a rotation $\Omega_x$ around a sensitive axis (such as the x-axis) of yaw-rate sensor 30 during a rotational movement of oscillating body 31 around the oscillation axis, Coriolis forces $F_{corx}$ act on the oscillation axis, which cause tilting or pivoting of oscillating body 31 in relation to a surface of substrate 35. This tilting around the x-axis is shown in FIG. 2.

The tilting of oscillating body 31 causes a distance reduction of a first end or edge 36 of the oscillating body and a distance increase of a second end or edge 37 of oscillating body 31, which is diametrically opposite to first end 36, in relation to substrate 35. To ascertain the increase and decrease of the distances of ends 36 and 37 with respect to substrate 35, detection electrodes 38a are formed opposite to ends 36 and 37 on substrate 35. The increase and decrease of the distance between ends 36, 37 and associated detection electrode 38a causes a change of the capacitance of the capacitive element formed by end 36 or 37 and detection electrode 38a. This change is proportional to Coriolis force $F_{corx}$. By measuring and analyzing this capacitance change, yaw rate $\Omega_x$ of the rotational movement of the second yaw-rate sensor element around a sensitive axis (the x-axis here) may thus be concluded.

In a variation of this exemplary embodiment, it is also possible to provide further detection electrodes 38b on the diametrically opposite side of oscillating body 31 in addition to detection electrode 38a. These may be provided on the inner side of a cap or a housing, which accommodates sensor 100. This system is advantageous because in this case detection electrodes 38a, 38b are situated symmetrically to oscillating body 31.

Yaw-rate sensor element 30 may be designed so that it detects not only rotations around the x-axis, but also rotations around the y-axis. Two further detection electrodes (not shown in greater detail), via which rotations around the y-axis are detected, are situated for this purpose on appropriate locations of substrate 35 opposite to oscillating body 31. For example, four detection electrodes may be situated at angular intervals of 90° along the circumference of oscillating body 31. First yaw-rate sensor element 30 thus detects yaw rates $\Omega_x$ and $\Omega_y$ of rotations around rotational axes which are "in plane" or within the plane in which oscillating body 31 extends.

First yaw-rate sensor element 20 and second yaw-rate sensor element 30 are connected to one another by coupling webs 40 (coupling links). These coupling webs 40 are each connected at one end to one of drive frames 22 and at their other end to the circumference of oscillating body 31. In the present example, coupling webs 40 are angled, but they may also be curved. Their shape may be selected in particular so that mechanical tensions in coupling webs 40 are small in operation and a suitable spring constant for coupling first and second sensor elements 20 and 30 is simultaneously achieved. Coupling webs 40 may have a width of approximately 2 μm, for example.

Coupling webs 40 mechanically couple second yaw-rate sensor element 30 to first yaw-rate sensor element 20. If first yaw-rate sensor element 20 is set into oscillation by applying a drive voltage between drive electrodes 23 and the detection electrodes diametrically opposite thereto, both linear oscillators 21-1, 21-2 oscillate antiparallel to one another in the +y-direction or −y-direction. Coupling webs 40 are thus also moved antiparallel to one another, whereby torque $F_{rot}$ acts on oscillating body 31, and oscillating body 31, which is mounted via hub 33, is set into a rotational oscillation.

It is to be noted that only first sensor element 20 is directly driven. A separate drive is not provided for second sensor element 30, so that one drive and the associated controller are able to be eliminated by this configuration.

Drive frame 22, coupling webs 40, and oscillating body 31 lie in one plane and may advantageously be manufactured from one piece. In particular, it is possible to manufacture them from one piece of silicon. In this case, first and second sensor elements 20 and 30 may be situated on a single semiconductor chip. For this purpose, the movable oscillating body may be etched on one wafer side of a silicon wafer and may be partially detached from the substrate and thus made movable. Furthermore, it is possible to also house the analysis electronics for analyzing the sensor signals output by sensor elements 20 and 30 on the same chip as sensor elements 20 and 30. A compact yaw-rate sensor system is thus made possible.

Figure 3:
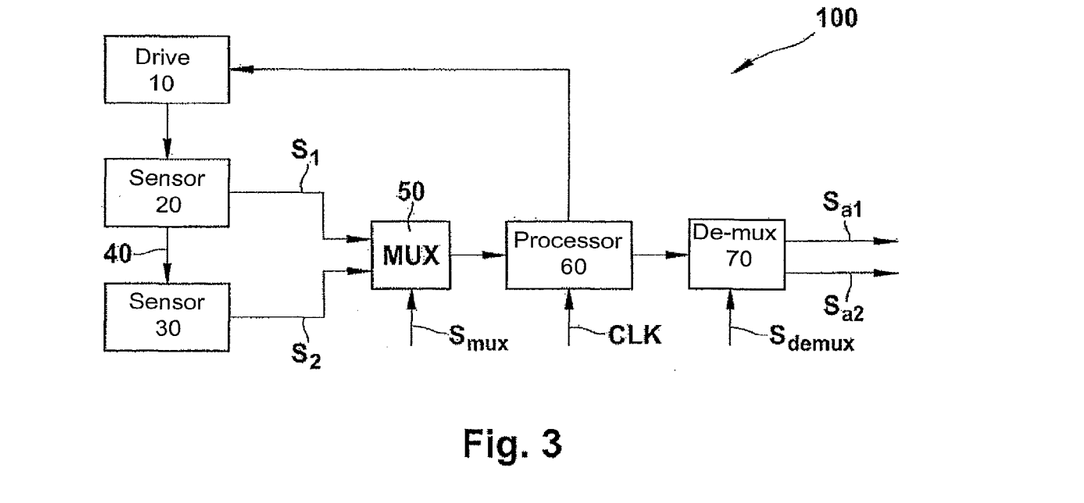
FIG. 3 is a block diagram, which schematically shows the configuration of a yaw-rate sensor according to the first specific embodiment.

FIG. 3 is a block diagram which schematically shows the configuration and the signal flow of a yaw-rate sensor 100 according to the first exemplary embodiment.

Yaw-rate sensor 100 shown in FIG. 3 includes a drive 10, a first yaw-rate sensor element 20, a second yaw-rate sensor element 30, a multiplexer 50, a signal processing unit 60, and a demultiplexer 70. These components may be provided in an integrated construction on a single semiconductor chip, which allows a particularly compact design of yaw-rate sensor 100.

Drive 10 is connected to an internal chip voltage supply (not shown) and drives first yaw-rate sensor 20 in the above-described way, namely by applying a voltage between drive electrode 23 and the diametrically opposite counter electrode. First yaw-rate sensor element 20 is thus set into oscillation. This oscillation is mechanically transmitted by coupling links 40 to second yaw-rate sensor element 30, which is thus also set into oscillation.

The capacitance change of the capacitive elements formed by detector electrodes 26 and the stator electrodes is converted by a capacitance measuring unit (not shown in greater detail) or a C/U converter into a voltage signal $S_1$, which contains information about the yaw rate around the z-axis, which is applied to sensor 100. This voltage signal $S_1$ is supplied to multiplexer 50. If first sensor element 20 has two linear oscillators 21-1 and 21-2 as shown in FIG. 1, a corresponding voltage signal is produced for each of linear oscillators 21-1 and 21-2, the difference between these voltage signals is calculated by a subtracting unit, and the differential signal is supplied as voltage signal $S_1$ to multiplexer 50.

The capacitance change of the capacitive elements formed by oscillating body 31 and detection electrodes 38a and 38b is converted by a capacitance measuring unit (not shown in greater detail) or a C/U converter into a voltage signal $S_2$, which contains information about yaw rate $\Omega_y$ around the y-axis, which is applied to sensor 100. This voltage signal $S_2$ is also supplied to multiplexer 50. In an alternative specific embodiment, second yaw-rate sensor element 30 may also produce two voltage signals, which contain information about yaw rate $\Omega_x$ around the x-axis, which is applied to sensor 100, and information about yaw rate $\Omega_y$ around the y-axis. In this case, two corresponding voltage signals $S_2$ and $S_3$ are supplied to the multiplexer.

Multiplexer 50 receives a control signal $S_{demux}$ (which may be identical to signal $S_{mux}$ or derived therefrom) and switches cyclically between supplied voltage signals $S_1$ and $S_2$ (and optionally $S_3$) as a function of this control signal $S_{demux}$. The particular voltage signal output by multiplexer 50 is processed further by a signal processing unit 60.

Figure 4:
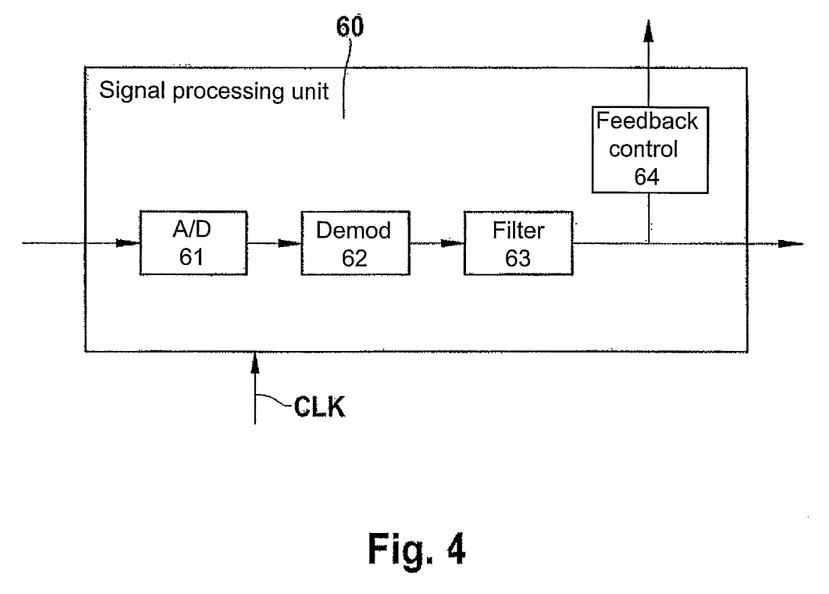
FIG. 4 is a block diagram which shows a simple schematic example of signal processing unit 60 in FIG. 3.

FIG. 4 schematically shows a simple example of signal processing unit 60. An internal chip clock signal CLK is supplied to signal processing unit 60. First, the analog voltage signal output by multiplexer 50 is converted by an analog-digital converter 61 into a digital voltage signal as a function of clock signal CLK. This digital voltage signal is demodulated by a demodulator 62. Because yaw-rate sensor elements 20 and 30 are set into oscillation at a specific drive frequency f, they output sensor signals which oscillate at identical frequency f. Upon application of a yaw rate, signals which contain information about the applied yaw rate are superimposed on these periodic signals. The digitized sensor signals are then modulated by demodulator 62 and subsequently filtered using a low-pass filter 63, in order to obtain the corresponding signal component in the baseband. The filtered signal is output to demultiplexer 70.

Furthermore, the filtered signal is also supplied to a feedback control 64, which produces a control signal and feeds it back to drive 10 after a D/A conversion. A control loop is thus formed, which subjects the output sensor signal to a feedback control.

Demultiplexer 70 receives a control signal $S_{mux}$ and switches the supplied sensor signal cyclically to various outputs or output lines as a function of control signal $S_{mux}$. A first output signal $S_{a1}$ output by demultiplexer 70 thus corresponds to the yaw rate around the z-axis, which is detected by first yaw-rate sensor 20. A second output signal $S_{a2}$, which is output by demultiplexer 70, corresponds to the yaw rate around the y-axis which is detected by second yaw-rate sensor 30. If second yaw-rate sensor 30 is designed to detect the yaw rate around two sensitive axes (x-axis and y-axis), demultiplexer 70 may correspondingly also output a second output signal $S_{a2}$ and a third output signal $S_{a3}$, which represent the yaw rate around the x-axis and the y-axis, respectively.

The oscillations of first and second yaw-rate sensor elements 20 and 30 are mechanically coupled to one another by coupling links 40, so that their oscillation is also synchronized with one another and has the same frequency and phasing. This allows only one detection circuit to be provided for all measurement axes. Correspondingly, only one signal processing unit 60 for both yaw-rate sensors 20, 30 is provided in yaw-rate sensor 100 of this first specific embodiment. Therefore, only one A/D converter 61, one demodulator 62, and one low-pass filter 63 are also provided. A significant savings with respect to circuitry expenditure and space required on a semiconductor chip may thus be achieved, because these components do not have to be provided separately for each of the yaw-rate sensor elements. Furthermore, the chip architecture required for the signal processing is also simplified, because only one current or voltage supply and also only one system clock CLK must be provided for the components provided in signal processing unit 60. Optionally provided components for monitoring and regulating the drive frequency must also only be provided once.

The first exemplary embodiment was explained for the case in which drive 10 drives first yaw-rate sensor element 20, the oscillation or excitation of first yaw-rate sensor element 20 being transmitted by coupling links 40 to second yaw-rate sensor element 30. However, in a variation of this exemplary embodiment, it is also possible that drive 10 does not drive yaw-rate sensor element 20, but rather at least one of coupling links 40 or also both coupling links 40. In this case, drive electrodes 23 are not provided on drive frame 22, but rather are provided on suitable positions of coupling links 40, for example, on the upper or the lower side of the horizontal sections of coupling webs 40 in FIG. 1.

In this case, coupling links 40 are set into oscillation in the y-direction by applying a suitable drive voltage to drive electrodes 23. Because coupling links 40 are each connected at their ends to oscillating body 31 of rotational oscillator 30 or to drive frame 22 of one of linear oscillators 21-1, 21-2, this oscillation is transmitted directly to rotational oscillator 30 and linear oscillators 21-1, 21-2, so that driving or excitation of coupling links 40 also causes driving of first and second yaw-rate sensor elements 20, 30. Drive 10 may excite both coupling links 40 into antiparallel oscillations, so that linear oscillators 21-1, 21-2 also oscillate antiparallel to one another and oscillating body 31 is set into a rotational oscillation.

Second Exemplary Embodiment

Figure 5:
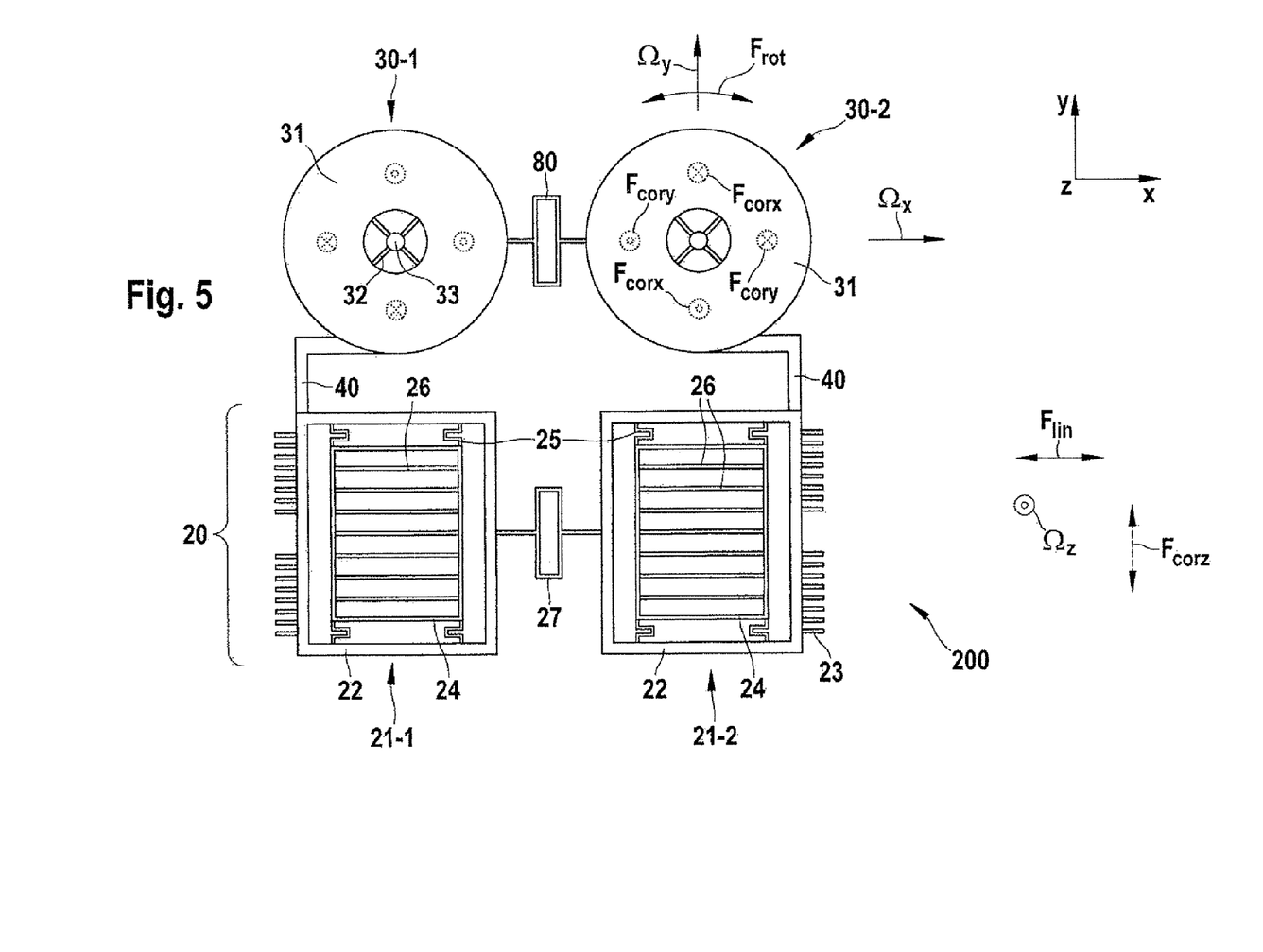
FIG. 5 is a diagram of a yaw-rate sensor according to a second specific embodiment.

FIG. 5 is a diagram of a yaw-rate sensor 200 according to a second specific embodiment of the present invention. Elements which have identical construction or function as elements of the first specific embodiment are identified using identical reference numerals and are not explained in greater detail. This also applies for the following exemplary embodiments.

Yaw-rate sensor 200 as per a second specific embodiment according to the present invention has two linear oscillators 21-1, 21-2 as first yaw-rate sensor element 20 and two rotational oscillators 30-1 and 30-2 as second yaw-rate sensor elements 30. Linear oscillator 21-1 is mechanically coupled via a coupling web 40 to one rotational oscillator 30-1, and linear oscillator 21-2 is mechanically coupled via a coupling web 40 to other rotational oscillator 30-2. Coupling webs 40 are each connected at one end to one of drive frames 22 and at their other end to the circumference of particular oscillating body 31. Oscillating bodies 31 of both rotational oscillators 30-1 are mechanically coupled to one another via a spring element 80.

Only one drive which sets linear oscillators 21-1, 21-2 into oscillation by applying a drive voltage between drive electrodes 23 and counter electrodes is also provided in this specific embodiment. In contrast to the first specific embodiment, linear oscillators 21-1 and 21-2 move toward one another or away from one another, i.e., they oscillate in the x-direction. This oscillation is transmitted via coupling webs 40 to oscillating bodies 31 of rotational oscillators 30-1 and 30-2 and converted there into a rotational oscillation. Rotational oscillators 30-1 and 30-2 also oscillate in opposing directions.

Generally the same advantages result with this specific embodiment as in the first specific embodiment. Rotational oscillators 30-1 and 30-2 may be designed in such a way that one rotational oscillator 30-1 detects a rotation $\Omega_x$ around one rotational axis and other rotational oscillator 30-2 detects a rotation $\Omega_y$ around a rotational axis perpendicular thereto. However, they may also be designed in such a way that each of the rotational oscillators responds to rotations $\Omega_x$, $\Omega_y$ around the x-axis or the y-axis. In this case, a redundant detection of rotations around the x-axis or the y-axis may be implemented in a space-saving manner. The redundantly detected yaw rates may be averaged, for example.

Third Exemplary Embodiment

Figure 6:
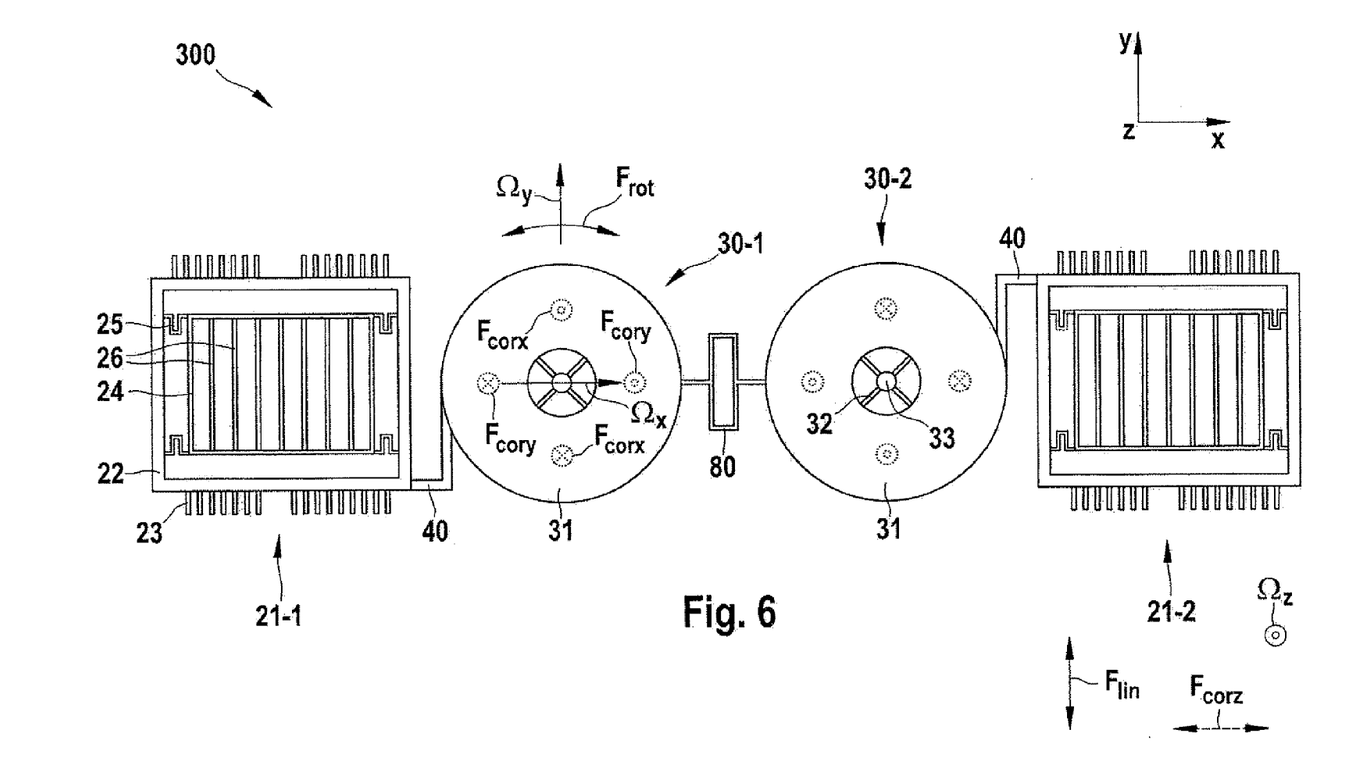
FIG. 6 is a diagram of a yaw-rate sensor according to a third specific embodiment.

FIG. 6 is a diagram of a yaw-rate sensor 300 according to a third specific embodiment of the present invention.

In this yaw-rate sensor 300, a first yaw-rate sensor element 20, which has two linear oscillators 21-1, 21-2, and two rotational oscillators 30-1 and 30-2 are situated adjacent to one another in a row. Two rotational oscillators 30-1 and 30-2 are situated between linear oscillators 21-1, 21-2 and are each connected via a coupling web 40 to adjacent linear oscillators 21-1, 21-2. Rotational oscillators 30-1 and 30-2 are connected to one another via a spring element 80.

Generally the same advantages result with this specific embodiment as in the first and the second specific embodiments.

Fourth Exemplary Embodiment

Figure 7:
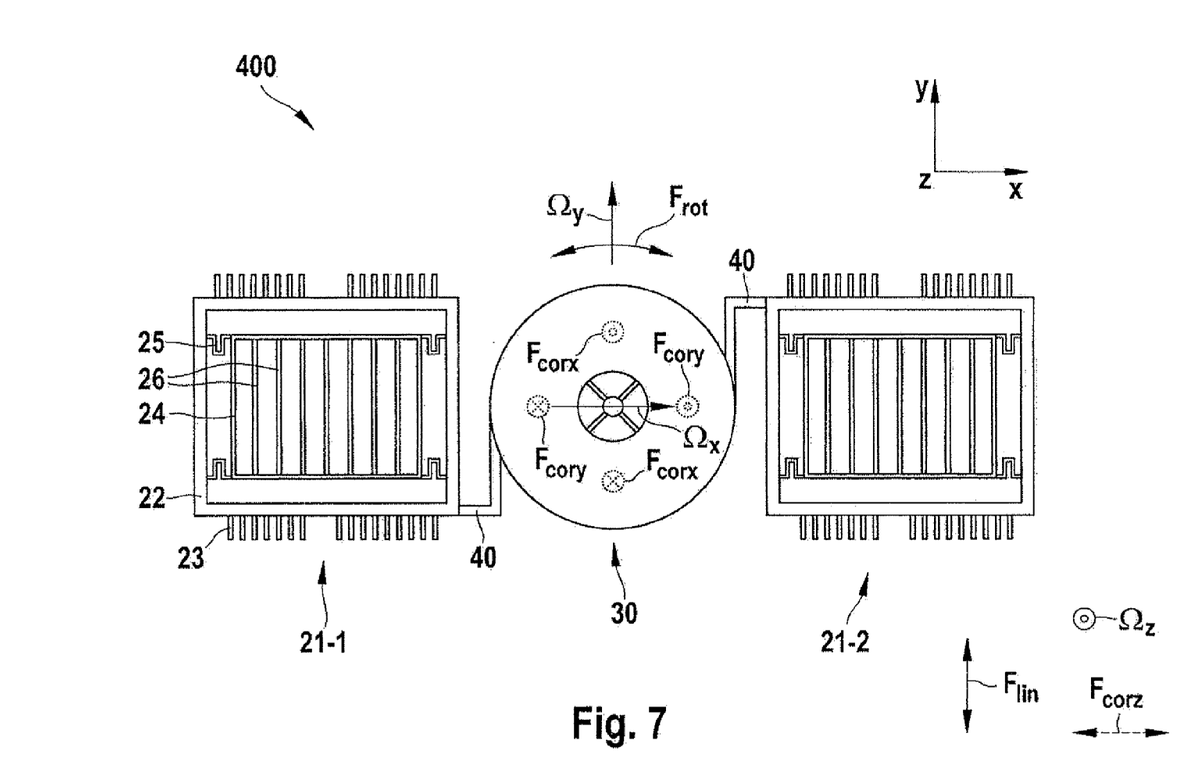
FIG. 7 is a diagram of a yaw-rate sensor according to a fourth specific embodiment.

FIG. 7 is a diagram of a yaw-rate sensor 400 according to a fourth specific embodiment of the present invention.

A first yaw-rate sensor element 20, which has two linear oscillators 21-1, 21-2, and second yaw-rate sensor element 30, which is designed as a rotational oscillator, are also situated adjacent to one another in a row in this yaw-rate sensor 400. Rotational oscillator 30 is situated between both linear oscillators 21-1, 21-2. Coupling webs 40 connect each of linear oscillators 21-1, 21-2 to an opposing end of rotational oscillator 30.

Generally the same advantages result with this specific embodiment as with the first and the second specific embodiments. Furthermore, this specific embodiment is particularly space-saving. Moreover, it is also advantageous due to its rotationally symmetric configuration.

Fifth Exemplary Embodiment

Figure 8:
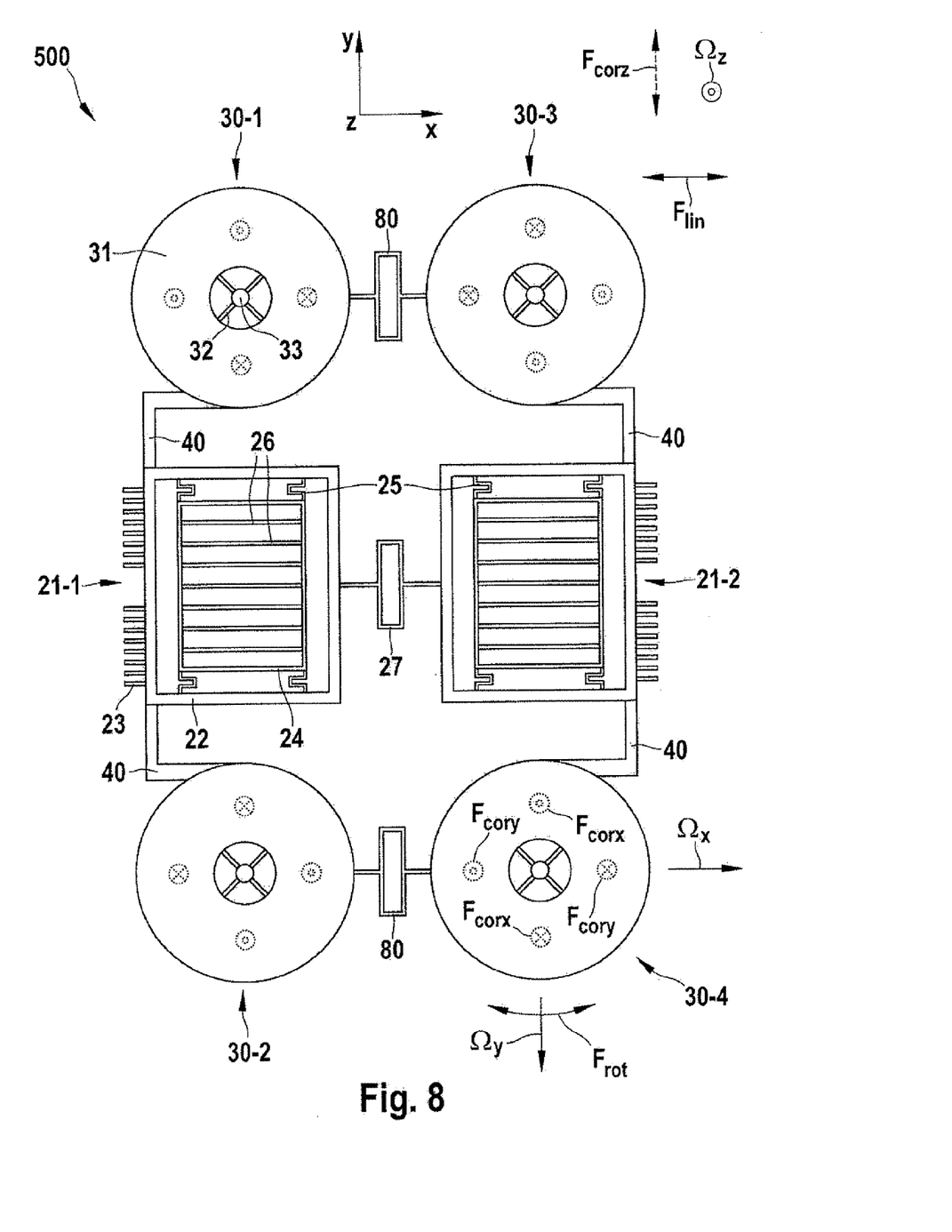
FIG. 8 is a diagram of a yaw-rate sensor according to a fifth specific embodiment.

FIG. 8 is a diagram of a yaw-rate sensor 400 according to a fifth specific embodiment of the present invention.

In this yaw-rate sensor 400, two linear oscillators 21-1 and 21-2 are situated between four rotational oscillators 30-1 through 30-4. First linear oscillator 21-1 is mechanically coupled on one side on its drive frame 22 via a coupling web 40 to a first rotational oscillator 30-1 and on its other side via a coupling web 40 to a second rotational oscillator 30-2.

Second linear oscillator 21-2 is mechanically coupled on one side on its drive frame 22 via a coupling web 40 to a third rotational oscillator 30-3 and on its other side via a coupling web 40 to a fourth rotational oscillator 30-4. First rotational oscillator 30-1 is mechanically coupled via a spring element 80 to third rotational oscillator 30-3. Second rotational oscillator 30-2 is mechanically coupled via a spring element 80 to fourth rotational oscillator 30-4. Linear oscillators 21-1 and 21-2 are also mechanically coupled to one another via a spring element 27.

Generally the same advantages result with this specific embodiment as with the first and the second specific embodiments. In particular, this specific embodiment allows a redundant but simultaneously space-saving system of multiple rotational oscillators on one chip.

Although the above specific embodiment was described on the basis of preferred exemplary embodiments, it is not restricted thereto, but rather modifiable in multiple ways. In particular, various features of the above-described designs are combinable with one another.

For example, in the above specific embodiments, the drive is provided on the linear oscillators in each case. However, it is also possible to drive the rotational oscillator(s) using one drive, and to transmit the rotational oscillation via the coupling links to one or more linear oscillators which are not separately driven.

Furthermore, coupling webs 40 are each connected to drive frame 22 in the above specific embodiments. However, it is also possible that coupling webs 40 are connected to detection frame 24.

Finally, the signal processing of sensor signals $S_1$ and $S_2$ was shown using discrete components (demodulator, filter, etc.). Of course, these components may also be implemented with the aid of a programmable processor, in particular as an ASIC. Thus, they do not necessarily have to be implemented as discrete components.

What is claimed is:

1. A micromechanical yaw-rate sensor, comprising:
a first yaw-rate sensor element which outputs a first sensor signal containing information about a rotation around a first rotational axis, the first yaw-rate sensor element being a linear oscillator and having a first oscillating body, which can be set into a linear oscillation in an oscillation plane perpendicular to the first rotational axis in relation to a substrate;
a second yaw-rate sensor element which outputs a second sensor signal containing information about a rotation around a second rotational axis, the second rotational axis being perpendicular to the first rotational axis, the second yaw-rate sensor element being a rotational oscillator having a second oscillating body which can be set into a rotational oscillation movement in the oscillation plane which is parallel to the second rotational axis in relation to the substrate;
a coupling link which mechanically couples the first yaw-rate sensor element and the second yaw-rate sensor element to one another; and
a drive which drives the first yaw-rate sensor element, driving of the first yaw-rate sensor element by the drive also causing driving of the second yaw-rate sensor element due to the mechanical coupling by the coupling link.

2. A micromechanical yaw-rate sensor, comprising:
a first yaw-rate sensor element which outputs a first sensor signal containing information about a rotation around a first rotational axis, the first yaw-rate sensor element being a linear oscillator and having a first oscillating body, which can be set into a linear oscillation in an oscillation plane perpendicular to the first rotational axis in relation to a substrate;
a second yaw-rate sensor element which outputs a second sensor signal containing information about a rotation around a second rotational axis, the second rotational axis being perpendicular to the first rotational axis, the second yaw-rate sensor element being a rotational oscillator having a second oscillating body which can be set into a rotational oscillation movement in the oscillation plane which is parallel to the second rotational axis in relation to the substrate;
a coupling link which mechanically couples the first yaw-rate sensor element and the second yaw-rate sensor element to one another; and
a drive which drives the coupling link, driving of the coupling link by the drive also causing driving of the first yaw-rate sensor element and the second yaw-rate sensor element.

3. The micromechanical yaw-rate sensor as recited in claim 1, wherein the second yaw-rate sensor element outputs a third sensor signal, the third sensor signal containing information about a rotation around a third rotational axis which is parallel to the oscillation plane and nonparallel to the second rotational axis.

4. The micromechanical yaw-rate sensor as recited in claim 1, wherein the first yaw-rate sensor element has two linear oscillators, and the rotational oscillator is situated between the two linear oscillators.

5. The micromechanical yaw-rate sensor as recited in claim 1, wherein the first yaw-rate sensor element and the second yaw-rate sensor element are integrated in a single semiconductor chip.

6. The micromechanical yaw-rate sensor as recited in claim 5, wherein the oscillators of the yaw-rate sensor elements are structured in semiconductor material of the semiconductor chip, and coupling webs manufactured from the semiconductor material are provided as the coupling link.

7. The micromechanical yaw-rate sensor as recited in claim 1, further comprising:
a multiplexer;
a signal processing unit; and
a demultiplexer;
wherein the first and the second yaw-rate sensor element each output at least one sensor signal containing information about a rotation around a rotational axis, to the multiplexer, the multiplexer supplying one of the sensor signals to the signal processing unit at various times, the signal processing unit subjecting the supplied sensor signal to processing and outputting a processed sensor signal to the demultiplexer, and the demultiplexer has multiple outputs, and switches the processed sensor signal to different outputs at various times.

8. The micromechanical yaw-rate sensor as recited in claim 7, wherein the signal processing unit includes a demodulator, which demodulates the supplied sensor signal, and a low-pass filter, which subjects the demodulated sensor signal to low-pass filtering.

9. The micromechanical yaw-rate sensor as recited in claim 1, wherein the first yaw-rate sensor element and the second yaw-rate sensor element have a congruent mirror plane.

* * * * *